Dec. 18, 1928.
J. H. P. WOOD
1,695,309
AUTOMATIC TEMPERATURE REGULATOR
Filed Nov. 19, 1927
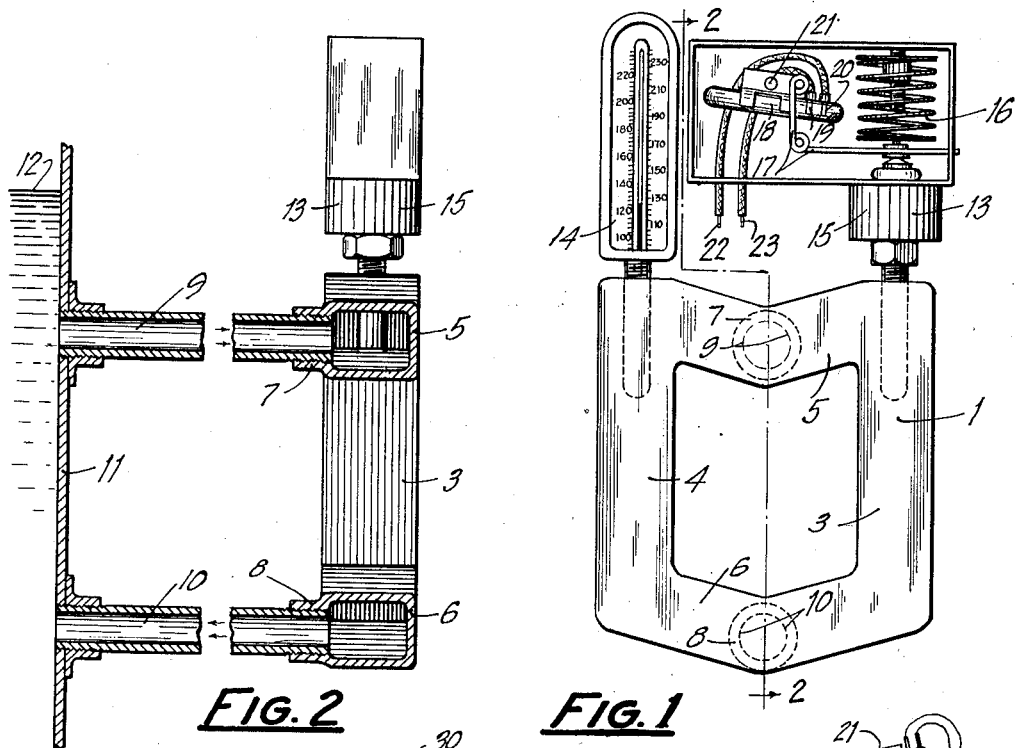
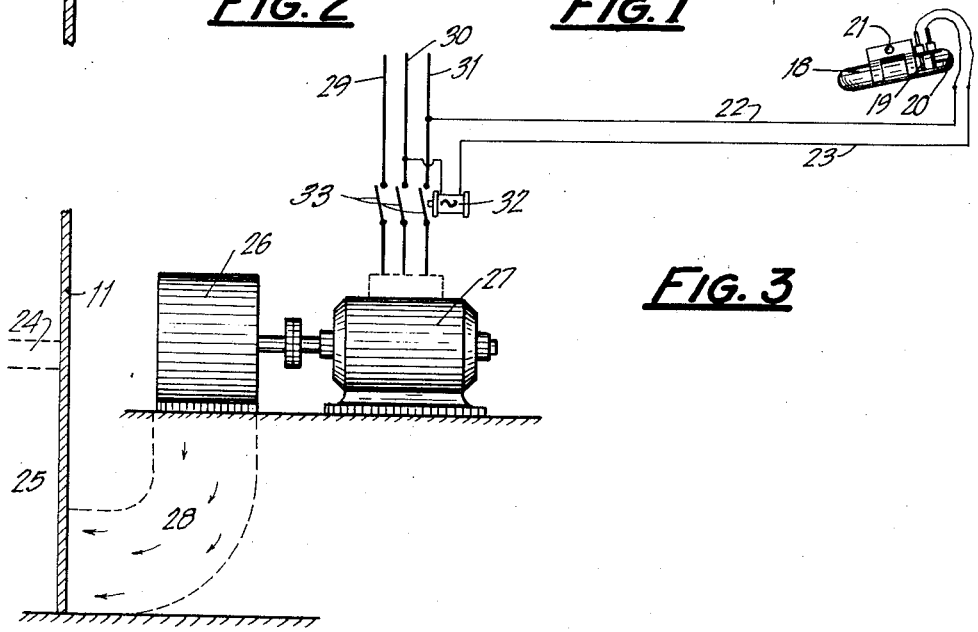
INVENTOR
John H. P. Wood.
By
ATTORNEY Patented Dec. 18, 1928.

1,695,309

UNITED STATES PATENT OFFICE.

JOHN H. P. WOOD, OF ALBANY, NEW YORK.

AUTOMATIC TEMPERATURE REGULATOR.

Application filed November 19, 1927. Serial No. 234,441.

My invention relates to automatic temperature regulators and particularly to means for maintaining a uniform temperature in buildings or the like which are heated by means of the circulation of vapor.

In automatically maintaining a uniform building temperature it has been the usual practice to distribute thermostats throughout the building which are electrically connected to means designed to increase the rate of fuel consumption in the heating unit, and which, ordinarily, cut said means into or out of operation when the temperature, at any thermostat falls below or exceeds a certain predetermined limit. With this system it is quite difficult to obtain a very close regulation. The actual temperature in the radiation system itself varies through a comparatively wide range, and a time-temperature curve shows peaks and depressions far removed from the mean which, if uniformly maintained, would be sufficient to keep the atmosphere of the building at the desired temperature. In other words, such a system of regulation creates "surges" of temperature in the radiation system which involve the unnecessary consumption of large quantities of fuel and, is not, therefore, highly efficient.

Again, in many buildings where an engineer is always present in the boiler room, the method of temperature regulation is purely manual. In such cases, the room temperature in the building is maintained somewhere near the desired average by periodically generating a steam pressure of several pounds, as indicated by the boiler room gauge, and thereafter permitting it to fall to zero. Such systems are far from economical and require the unnecessary burning of a great quantity of fuel.

It is quite possible at certain times of the year to heat a building by passing water vapor through the radiation system at a temperature considerably below the normal boiling point of water. This is particularly true where some means of creating a vacuum in the radiation system and the boiler is used. In such a case the pressure in the boiler is reduced and the normal boiling point of the water is correspondingly lowered. Where the vapor can be maintained in the system for prolonged periods at a substantially constant temperature, and below the normal boiling point of water, the room temperature can be maintained with absolute uniformity and with a minimum of fuel consumption.

My invention contemplates such a system of temperature regulation including a very simple device which may be applied directly to the boiler, and which will be of great value in maintaining a uniform temperature throughout the building, especially at those seasons of the year when some heat is required but when it is not desirable or necessary to maintain any pressure upon the boiler.

The objects of my invention, therefore, are to provide a temperature regulating system which will be semi-automatic in its operation and which will afford a considerable economy in fuel consumption. Another object is to provide a device which will uniformly maintain the fluid in the radiation system itself at the temperature required to maintain the desired temperature in the atmosphere of the building. Another object is to provide a means for use in connection with a vapor heating system whereby at certain seasons of the year, the desired temperature of the atmosphere in the building may be maintained substantially uniform without the necessity of creating a steam pressure in the heating unit. A further object is to provide a cheap and simple device of this character adapted for direct attachment to any boiler and which will function with substantially any type of thermostat. A still further object is to provide a device which may be used as an auxiliary regulator in connection with any other system or means for controlling the atmospheric temperature in a building.

With these objects in view my invention includes the novel elements and the combinations and arrangements of elements described below and illustrated in the accompanying drawings in which—

Fig. 1 is a front elevation of my device;

Fig. 2 is a section of Fig. 1 in the broken plane 2—2; and

Fig. 3 is a more or less typical diagram illustrating the electrical circuits from the thermal element to a motor operated blower or the like.

Referring to the drawings, my device in its preferred form comprises a hollow casting, 1, comprising two, vertically extending, hollow legs, 3 and 4, which are connected at the top by a transverse hollow portion, 5, and at the bottom by a hollow portion, 6. The rear, central portion of the transverse part, 5, is provided with an internally threaded boss or nipple, 7, and the rear of the transverse portion, 6, is also provided with a similar nipple, 8. Threaded into these nipples are pipes, 9 and 10, respectively, leading into the boiler, 11, below the level of the water, 12, therein. When the water is heated, a circulation is created outwardly from the boiler through the pipe, 9, into the casting, 1, thence, downwardly through the vertical legs of the casting and back to the boiler through the pipe, 10. The top of the casting directly over the vertical legs, 3 and 4, is provided with threaded openings, one of which is designed to receive a thermostatic element, 13, and the other one of which is designed to receive an ordinary thermometer, 14. When a circulation has been created within the casting, 1, the thermometer, 14, will indicate the temperature of the water in the boiler, 11. The thermometer, 14, is merely used for calibrating the thermostat as will be later explained.

The thermostatic element, 13, may be of any standard type adapted for adjustment to function at various temperatures. In the type illustrated the cylinder, 15, is filled with some liquid which will expand when the temperature is raised. The expansion of the liquid forces a diaphragm therein upwardly against the compression of the spring, 16, and this upward movement by means of the levers, 17, may be used to tilt a tube, 18, containing mercury, and having electrical terminals, 19 and 20, therein, at one end. This tube is pivoted at 21. In the design shown, contraction of the liquid in cylinder, 15, caused by a fall in temperature, tilts the tube, 18, to the position shown in Fig. 1. The mercury therein flows to the lower end of the tube, which in this case is at the right, and forms a connection between the terminals, 19 and 20, completing an electric circuit through wires, 22 and 23.

Referring to Fig. 3 the tube, 18, is represented as tipped in the opposite direction so that the mercury in the tube flows away from the terminals, 19 and 20, and the circuit is then broken. In this figure, 11 represents the boiler, 24 represents the grate therein, 25 represents generally the ash pits or chamber below the grate, 26 is a blower which is directly connected to the motor, 27, and which is designed to force air through the duct, 28, into the ash pit. 29, 30 and 31 represent the main electric lines of a three phase system. 32 is a relay operated by the switch in the thermostat and is designed to throw the main switch, 33, to connect the motor, 27, with the main electric lines.

In the early fall or late spring when some small degree of heat must be maintained in the radiation system, but when a maintenance of steam pressure therein would produce a great deal of unnecessary heat, my device will be found of the greatest value. At such times, it may be ascertained by experimental determination that the building is satisfactorily heated when the water in the boiler is maintained at around, say 190 degrees. The thermostat is then set to operate when the thermometer, 14, indicates the required boiler temperature. Any difference in boiler temperature is immediately reflected by the reading of the thermometer, and the water from the boiler flowing in both directions from pipe, 9, through the casting, 1, and about the thermometer and the thermostatic element, will immediately cause the thermostat to cut the blower, oil or gas burner, 26, into or out of operation, as the case may be. Thus, the temperature of the water in the boiler may be maintained within one or two degrees of the desired point.

The particular shape of the casting, 1, is not of material importance except that it should be provided with a passage through which there will be a continuous flow from the boiler about the thermometer and the thermal element of the automatic switch. In other words, particularly around these elements an unrestricted flow should be provided and there should be no pockets wherein water may remain stationary. For this reason I prefer that the opening in the transverse portion, 5, where the water enters from the boiler should be somewhat lower and should be equally spaced from the points where the thermometer and thermostat enter the casting. Likewise, the water passage should slope generally from the inlet to the outlet of the casting as shown in Fig. 1.

While my device is particularly adapted for obtaining a very close regulation of building temperatures at such times when no pressure is necessary upon the boiler, it is equally well suited as a semi-automatic regulator when some substantial steam pressure is required. In any case it is merely a matter of calibrating the thermostat so that it will function at the proper temperature. For example, it may be noted that an outdoor temperature of 18 degrees Fahrenheit requires a boiler water temperature of 215 degrees Fahrenheit to adequately heat the building. The thermostat may be immediately set to operate the electric switch when the boiler temperature falls below this point, and thereafter the operation is automatic. Where the device is equipped with a sensitive thermostat, a regulation of water temperature in the boiler may be maintained within two or three degrees of the desired point. Where the fuel consumption is controlled by thermostats actuated by room temperatures no such degree of regulation is possible, and consequently the rate of fuel consumption is considerably less uniform and the system is less efficient.

While I have described and illustrated my invention in its preferred embodiment it is to be understood that the words which I have used are words of description rather than of limitation and that changes within the purview of the appended claims may be made without departing from the true scope and spirit of my invention in its broadest aspects.

What I claim is—

1. In a building temperature regulating system of the character described, the combination with a boiler, of a hollow, ring-like element communicating with said boiler at vertically spaced points below the water level therein and adapted to permit a circulation of water from the boiler therethrough, an adjustable thermostat having its thermal element within said ring, and a thermometer mounted on said ring adapted to indicate the temperature of the water therein at which said thermostat will operate and providing a means whereby said thermostat may be adjusted to operate at a definite predetermined water temperature.

2. A thermostat support comprising a hollow, metal ring having openings in oppositely disposed portions thereof providing an entrance and an exit for water circulated through said ring, and having spaced openings adjacent said water entrance adapted to receive a thermostat and a calibrating thermometer therefor.

3. A thermostat carrier comprising a hollow element having openings therein for the ingress and egress of water, and provided with spaced water passages substantially symmetrically disposed about the ingress opening.

4. A thermostat carrier comprising a hollow structure having openings therein for the ingress and egress of water and enclosing separate water passages diverging from the ingress opening to permit a circulation of water about a thermostat and a calibrating thermometer therefor having elements projecting into said passages on opposite sides, respectively, of the ingress opening.

5. The combination with a thermostat and a calibrating thermometer therefor, of a common support enclosing a water passage into which the thermostat and thermometer project; said support being provided with an opening for the ingress of water to said passage positioned to permit a substantially equal divergence of flow about the thermometer and thermostat respectively.

JOHN H. P. WOOD.